United States Patent [19]

Danielson

[11] 4,082,706

[45] Apr. 4, 1978

[54] NON-STAINING ANTIOZONANT ENAMINES

[75] Inventor: Arthur C. Danielson, Royal Oak, Mich.

[73] Assignee: Uniroyal, Inc., New York, N.Y.

[21] Appl. No.: 586,829

[22] Filed: Jun. 13, 1975

[51] Int. Cl.² ............................................. C08L 7/00
[52] U.S. Cl. ............................... 260/5; 260/23 S; 260/23.5 A; 260/23.7 M; 260/28.5 B; 260/42.47; 260/45.8 N; 260/45.8 NZ; 260/45.8 NW; 260/239 B; 542/400; 542/424; 260/239 BC; 260/268 R; 260/283 R; 260/293.65; 260/283 R; 260/293.65; 260/293.51; 260/326.8; 260/583 H
[58] Field of Search ............... 260/5, 23 S, 23.5 A, 260/23.7 M, 28.5 B, 42.47, 45.8 NZ, 45.8 NW, 45.8 N, 797, 800, 801, 240 F, 326.8, 293.65, 293.5, 247, 239 B, 268 R, 239 BC, 283 R, 583 H, 240 R

[56] References Cited

U.S. PATENT DOCUMENTS

| | | |
|---|---|---|
| 2,198,260 | 4/1940 | van Melsen ........................... 260/584 |
| 2,778,826 | 1/1957 | Schmidle .............................. 260/247 |
| 3,074,940 | 1/1963 | Benzing ............................... 260/247 |
| 3,079,366 | 2/1963 | Boyle et al. .......................... 260/45.9 |
| 3,211,793 | 10/1965 | Roos ................................... 260/577 |
| 3,331,875 | 7/1967 | Strickland ......................... 260/583 G |
| 3,344,109 | 9/1967 | Ley et al. .............................. 260/800 |
| 3,359,319 | 12/1967 | Fawcett ............................... 526/248 |
| 3,361,757 | 1/1968 | Winberg ............................ 260/309.7 |
| 3,370,060 | 2/1968 | Alt et al. ............................ 260/247.7 |
| 3,428,633 | 2/1969 | Speziale et al. ...................... 260/247 |
| 3,506,655 | 4/1970 | Jeffreys .............................. 260/326.8 |
| 3,639,485 | 2/1972 | Nast et al. ....................... 260/45.7 R |
| 3,706,802 | 12/1972 | Arrigo .............................. 260/566 F |
| 3,759,908 | 9/1973 | Lamon .............................. 260/293.51 |

OTHER PUBLICATIONS

West, The Chemistry of Enamines, vol. 40, No. 4, Apr., 1963, pp. 194–200.

*Primary Examiner*—Melvyn I. Marquis
*Attorney, Agent, or Firm*—Stephen P. Gilbert

[57] ABSTRACT

Novel enamines, obtained from aldehydes or ketones, may be incorporated into a white-wall tire stock to greatly enhance the ozone resistance of the stock while greatly reducing discoloration or staining of the stock. The aldehydes and ketones utilized are those having at least one alpha hydrogen linked to the carbonyl group.

21 Claims, No Drawings

NON-STAINING ANTIOZONANT ENAMINES

This invention relates to enamines obtained from aldehydes and ketones in which at least one alpha hydrogen is linked to the carbonyl group. The enamines may be incorporated into standard, factory, white-wall stock to enhance the resistance of the stock to ozone deterioration while preventing discoloration or staining of the stock.

The problem of imparting ozone resistance to vulcanized products such as tires has received considerable attention. These vulcanized products often develop cracks while being exposed to ozone, and when also subjected to mechanical strain, such as compression, shearing, elongation, and the like. Previous attempts to reduce or overcome this problem have centered on adding to the stock such ingredients as aromatic diamines, aromatic diamine derivatives, and waxes. Where the base stock employed contains carbon black, aromatic diamines and aromatic diamine derivatives have been used to impart ozone resistance with success since there is no problem with discoloration or staining of the already black stock. Waxes have also been utilized previously, but with limited success due to the difficulty of insuring that the wax layer remains intact. Under the stresses to which these articles are subjected, the wax film often separates or tears causing cracks to develop of greater magnitude than articles having no wax.

Other attempts to utilize various antiozonants ad antioxidants include for example, U.S. Pat. No. 3,639,485 to Nast et al. which describes the use of certain cyclic unsaturated ethers obtained from aldehydes, thioethers, and their derivatives for use as antiozonants, as well as U.S. Pat. No. 2,778,826 to Schmidle which describes the use of nitrogen-containing compounds as antioxidants. While the Nast et al. products are an improvement over prior antiozonants, they are not completely satisfactory as they both lack durability and have a tendency to discolor or stain the stock in which they are incorporated.

The products disclosed in Schmidle appear to be acceptable as antioxidants, but not as antiozonants. In short, the Schmidle antioxidant products cannot be generally equated with products useful as antiozonants in white-wall stock for tires.

Other antiozonants and antioxidants are also known but they have limited or no use as ozone resistors wherein the lack of staining is a critical feature. Representative products are disclosed in U.S. Pat. Nos. 2,198,260 (insecticides, intermediates, pharmaceuticals, surface active agents, fuel preparation; 3,079,366 (ultraviolet absorber compounds); 3,211,793 (antioxidants for vulcanizates prepared from natural and synthetic rubber); 3,359,319 (films, coatings, etc.) 3,361,757 (oxygen scavengers); 3,370,060 (compounds having antioxidant and biological properties); 3,428,633 (compounds useful as feed additives for animal foods); and 3,706,802 (antiozonants or metal deactivators).

Of the above-mentioned disclosures, U.S. Pat. Nos. 3,211,793, 3,359,319, 3,361,757 and 3,706,802 describe compounds which superficially appear to be structurally similar to the enamines of this invention, but these structural similarities are more notable for the differences between them and the enamines described hereinbelow. Furthermore, these compounds are either ineffective as antiozonants per se or while working as antiozonants stain and discolor a white stock in which they may be used.

It has now been found that the ozone resistance of a white-wall tire stock can be greatly improved by incorporating therein an enamine of this invention. In addition, these new enamines do not stain or cause discoloration of the stock.

The enamines of the invention are those having the general formula:

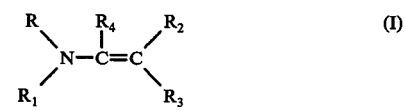

wherein N is directly linked by a single bond to a carbon-carbon double bond; R and $R_1$ are each primary or secondary, saturated or unsaturated, alkyl groups having from 1 to 8 carbon atoms, or together with the nitrogen form a cyclic ring structure having 4 to 6 carbon atoms in the ring; $R_2$ and $R_3$ are each hydrogen or alkyl groups having 1 to 6 carbon atoms, or can be joined together to form a cyclic ring structure containing 5 to 7 carbon atoms; and $R_4$ is hydrogen or a primary or secondary alkyl group having 1 to about 4 carbon atoms.

Various methods may be employed to prepare the enamines useful herein. These include the methods disclosed in the above-cited U.S. Pat. Nos. 3,359,319, 3,370,060, 3,428,633 and 3,706,802. Additional methods of preparing enamines in general are disclosed in U.S. Pat. Nos. 3,282,925, 3,331,875 and 3,530,120.

Accordingly, the enamines of the invention can be readily obtained by refluxing, in a suitable solvent equal molar amounts of an aliphatic secondary amine and an aldehyde or ketone having at least one hydrogen alpha to the carbonyl group. The water produced is collected and measured in a Dean Stark trap and, when all the water has been collected (1 mole of water per mole of functional groups), the solvent is stripped off. Refluxing generally takes about 3 to 72 hours. The resulting residue is then distilled preferably under vacuum to provide the enamines which have boiling points generally in the range of about 90°-160° C. Some of the products may be solids though generally they are liquids at room temperature. In some instances, some polymerization may occur, in which event the residue can be vacuum distilled a second time to obtain the desired product. The solvent employed may be any suitable non-water soluble organic solvent such as benzene, toluene, hexane, xylene, heptane, octane, and the like.

The overall reaction may be expressed by the following general formula:

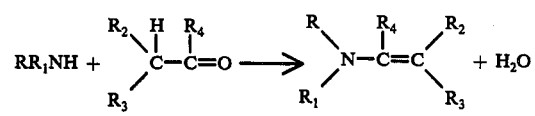

wherein the various R groups are as previously defined.

When $R_4$ is hydrogen, an aldehyde is reacted with the secondary amine, and the resulting structure is:

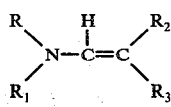

When R₄ is a primary or secondary alkyl group, a ketone is reacted with the secondary amine, and the resulting structure is:

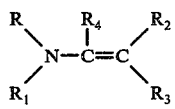

Irrespective of whether a ketone or an aldehyde is employed, it is critical to this invention that there be at least one hydrogen alpha to the carbonyl group on the aldehyde or on the ketone to assure the formation of the carbon-carbon double bond in the resulting enamine. It is further critical that the amine not be on an aromatic ring. When these criteria are compared with the prior art enamines referred to hereinabove, it will be readily seen that these prior art enamine compounds are not the same as those of the invention. Furthermore, those prior art enamines wherein the amine is linked to an aromatic ring are known to cause staining as is shown in the Examples set forth below.

Exemplary of the R and $R_1$ cyclic amines which can be employed are those having about 4–7 carbon atoms such as pyrrolidine, piperidine, morpholine, hexamethyleneimine, homopiperidine, piperazine, homopiperazine, homomorpholine, tetrahydroquinoline, and the like. Preferable amines are di-(2-ethyl hexyl)amine, diallylamine, and dibutylamine. Aromatic secondary amines such as N-methylaniline are to be avoided since the resulting enamines cause staining.

Examples of the $R_2$ and $R_3$ groups that can be used are such as methyl, ethyl, propyl, isopropyl, n-amyl, 2-amyl, 3-amyl, or phenyl. Preferably one of $R_2$ and $R_3$ is alkyl with up to 6 carbon atoms whereas the other has up to 2 carbons. Alternatively, $R_2$ and $R_3$ may be joined together to form cyclic compounds such as cyclohexane or cyclohexene.

$R_4$ is preferably hydrogen, methyl or ethyl.

When a ketone is used it may be either symmetrical or unsymmetrical, though when it is unsymmetrical a mixture of products usually results.

The following two examples show the basic procedures for preparing the enamines of the present invention. These procedures were then repeated to prepare the enamines that were tested in the white wall tire stocks shown below.

EXAMPLE 1

Preparation of 1-(2,6-dimethylmorpholino)-2-ethyl hexene-1.

This example shows a typical preparation of an enamine using an aldehyde. One-half molar amounts of both 2,6-dimethyl-morpholine and 2-ethylhexanal were refluxed in 100 ml. of toluene using a Dean Stark trap to collect the water formed. Aftr about 3–4 hours, 10 ml. of water had been collected and the toluene was stripped off. The residue was then vacuum distilled, collecting the portion boiling between 92° and 120° C. at 7.5 mm., most of this portion was collected between 114° and 115° C. The distillate was redistilled and the portion boiling between 115° and 120° C. at 7.7 mm. Hg was collected and used in Example 6 below.

Nitrogen analysis and an infra-red spectrum confirmed that 1-(2,6-dimethylmorpholino)-2-ethyl hexene-1 was the compound prepared.

Nitrogen Calc. 6.2% Found 5.8%.

EXAMPLE 2

Preparation of N-Cyclohex-1-enyl dibutylamine.

This example shows a typical preparation of an enamine of this invention using a ketone. A half mole of both cyclohexanone and di-n-butylamine in 100 ml. of benzene were refluxed for 2–3 days using a Dean Stark trap to collect the water as it formed. After about 6½ ml. of water was collected, the benzene was stripped off, and the enamine was collected as the fraction distilling between 121°–124° C. at 7.5 mm. Hg.

Nitrogen analysis and an infrared spectrum confirmed the compound.

A typical white wall stock recipe in which the enamines of the invention can be incorporated is shown in Table A below which also lists the general range of amounts for the various ingredients that make up the stock recipe.

TABLE A

| Typical White Wall Stock Recipe | |
|---|---|
| Ingredients | Range of Amounts (Parts by Weight) |
| Natural rubber (SNR) | 40 – 60 |
| Styrene butadiene synthetic rubber (SBR) | 20 – 40 |
| Ethylene propylene non-conjugated diene terpolymer (EPDM) | 15 – 30 |
| Titanium Dioxide (TiO₂) | 5 – 20 |
| Wax | 3 – 7 |
| Stearic Acid | 1 – 2 |
| N-cyclohexyl-2-benzothiazole sulfonamide (CBS) | 0.3 – 0.65 |
| Diphenyl guanadine (DPG) | 0 – 0.4 |
| Sulfur | 2.5 – 4.0 |
| Fillers | 10 – 50 |
| Tackifiers | 0.5 – 5 |

To impart enhanced ozone resistance without staining or discoloring such white wall stocks, the enamines of the invention can be incorporated in the stock recipes in amounts of about 0.5 to 2.5 parts by weight per 100 parts of white wall stock, preferably 1.0 to 2.0 parts by weight.

White wall stock recipes were prepared according to the general recipe set forth in Table A above both with and without an enamine as an antiozonant. The basic recipe employed is set forth in Table I below:

TABLE I

| Basic White Wall Stock Recipe | |
|---|---|
| Ingredients | Amount (Parts by Weight) |
| Natural rubber | 50 |
| Styrene butadiene synthetic rubber | 25 |
| EPDM | 25 |
| Titanium dioxide | 45 |
| Slow curing zinc oxide | 20 |
| Hydrated silica-white | 10 |
| Wax | 5 |
| Hydrocarbon resin tackifier (Softening point: 100° C.) | 2 |
| Stearic Acid | 1 |
| N-cyclohexyl-2-benzothiazole sulfonamide | 0.45 |
| Diphenyl guanadine | 0.2 |
| Sulfur | 4 |
| | 187.65 |

All except the last three ingredients were first milled together in a Banbury and, after thorough blending the last three ingredients were added until a homogeneous blend was obtained. Various enamines, prepared as described, were then added to the basic stock in different amounts. The blend was then vulcanized to obtain a standard, white-wall stock; the blending, milling and vulcanization all were carried out according to methods well known to those skilled in the art. A basic stock product and those containing the various enamines were then subjected to testing to measure the ozone resistance, cutting and discoloration or staining of the different products.

Two different tests were employed to determine the ozone resistance of the resultant products: The static ozone test and the dynamic ozone test. In the static ozone test, the product samples were stretched 12.5, 25 and 50% before being exposed to 50 parts by weight of ozone per hundred million parts of air (pphm) at room temperature, the product being exposed to the ozone atmosphere after each stretch. The time for the product to crack at the 50% stretch is then recorded.

In the dynamic ozone test, the product sample was fastened in a lay-flat condition to a fabric belt trained about two spaced-apart pulleys. The pulleys each had a diameter of 5 inches and were spaced at a distance of about 3 feet from their centers. One pulley was a driven pulley so that the fabric belt travelled conveyor belt fashion over and between the pulleys. As the fabric belt passed over each pulley, the product sample was subjected to stretching and then returned to its normal, relaxed condition when travelling between the pulleys. The driven pulley was run at speed sufficient to pass the test product over both pulleys at a frequency of 135 times per minute in at atmosphere containing 25 pphm ozone at room temperature. The time it took the test product to crack was recorded.

While variations in time for a product to crack will often be encountered due to variations such as ozone concentration, temperature, elongation or stretching irregularities, and the like, an unprotected stock product will generally crack in less than 6 hours when subjected to either the static or dynamic ozone tests.

Staining and/or discoloration results were obtained by exposing a portion of a test sample to ultra-violet light and then comparing the exposed portion of the sample to a masked portion thereof. Results were determined on the basis of "non-staining", "acceptable" (indicating only slight staining), (indicating moderate to heavy staining and therefore unacceptable).

The results of these tests are set forth in Table II below. In Table II, the enamines were incorporated in the standard white wall stock at 1.5 parts by weight in each instance. Samples A, B and C utilize compounds prepared in accordance with the disclosure of U.S. Pat. No. 3,639,485 referred to above. Only compound C is an enamine. The dynamic ozone resistance results are set forth on a "passed" or "failed" basis after comparing the enamine-containing stock to a stock containing no enamine or other antiozonant.

TABLE II

RESULTS OF OZONE AND STAINING TESTS

| Example No. | Enamine (b.p. range, ° C/P, mm Hg.) | Static Ozone Resistance (Time) | Dynamic Ozone Resistance | Staining |
|---|---|---|---|---|
| A | Tetrahydrobenzaldehyde ethylene acetal (205° – 207° C./atm.P.) | 24 hours | — | Stained |
| B | 2-Ethyl-hex-1-enyl butyl ether (195° – 198° C./atm.P.) | 72 hours | — | Stained |
| C | N-Cyclohex-3-enylidene methyl N-methylaniline (124° – 125° C./2 mm) | 16 hours | — | Stained |
| 3 | N-Cyclohex-2-enylidene methyl dibutylamine (102° – 142° C./2mm) | 6 hours | passed | Non-staining |
| 4 | N-Cyclohex-1-enyl dibutylamine (121° – 124° C./7.5 mm) | — | passed | Non-staining |
| 5 | 2-Dibutylaminoacetene-2 (145° – 160° C./7.5 mm) | 36 hours | passed | Non-staining |
| 6 | 1-(2,6-Dimethylmorpholine)-2-ethyl hexene-1 (115° – 120° C./7.7 mm) | 216 hours | passed | Non-staining |
| 7 | 1-(N-Methylcyclohexylamino)2-ethyl hexene-1 (114° – 116° C./4 mm) | 81 hours | passed | Non-staining |
| 8 | N-(Cyclohex-3-enylidene methyl)-2,6-dimethylmorpholine (115° – 118° C./4 mm) | 81 hours | passed | Non-staining |
| 9 | N-(cyclohex-3-enylidene methyl) hexamethyleneimine (110° – 113° C./4.5 mm) | 81 hours | passed | Non-staining |
| 10 | N-(Cyclohex-3-enylidene methyl) piperidine (92° – 95° C./3 mm) | 5 hours | passed | Non-staining |
| 11 | N,N'-Di(Cyclohex-3-enylidene methyl) piperadine (126° – 129° C. is Melting Point) | 72 hours | passed | Non-staining |
| 12 | N-(cyclohex-3-enylidene methyl)-N-methyl cyclohexylamine (110° – 120° -C./1–2 mm) | 36 hours | passed | Non-staining |
| 13 | N-(2-Ethylhex-1-enyl)-dibutylamine (97° – 99° C./2 mm) | 72 hours | passed | Non-staining |
| 14 | N-(Cyclohex-3-enylidene methyl) pyrrolidine (94° – 96° C./4.2 mm) | 24 hours | passed | Non-staining |
| 15 | N-(Cyclohex-2-enylidene methyl) diallylamine (90° – 100° C./4 mm) | 48 hours | passed | Non-staining |
| 16 | N-(6-Methyl cyclohex-3-enylidene methyl) dibutylamine (98° – 106° C./1.7 mm) | — | passed | Non-staining |
| 17 | Hept-1-enyl dibutylamine (100° – 130° C./1.7 mm) | 24 hours | passed Non-staining | |
| 18 | Product of poly(ethyleneimine) and tetrahydrobenzaldehyde | | | |

TABLE II-continued
RESULTS OF OZONE AND STAINING TESTS

| Example No. | Enamine (b.p. range, ° C/P, mm Hg.) | Static Ozone Resistance (Time) | Dynamic Ozone Resistance | Staining |
|---|---|---|---|---|
| | (Polymeric material) | 20 hours | passed | Non-staining |
| 19 | N-(Cyclohex-3-enylidenemethyl)-di(2-ethylhexyl)amine (120° – 127° C./0.1 mm) | — | passed | Non-staining |
| 20 | N-(Cyclohex-3-enylidene methyl)-N-methylbenzylamine (119° – 150° C./2 mm) | 24 hours | passed | Non-staining |

As can be seen from the results set forth in Table II above, even with the relatively small amounts of enamines of the invention, stock resistance to ozone is significantly improved without being discolored or stained as compared with the poor staining and ozone resistance results obtained when using prior art compounds.

What is claimed is:

1. A non-staining white-wall tire stock with improved ozone resistance comprising natural rubber, styrene-butadiene rubber, ethylene-propylene-non-conjugated diene terpolymer rubber, and as the antiozonant, an enamine of the formula

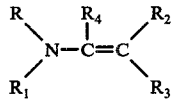

wherein R and $R_1$ are each primary or secondary, saturated or unsaturated alkyl groups with 1 to 8 carbon atoms, or together with the nitrogen form a cyclic ring structure having 4 to 6 carbon atoms; $R_2$ and $R_3$ are each hydrogen, an alkyl group with 1 to 6 carbon atoms, or joined together to form a cyclic ring structure having 5 to 7 carbon atoms; and $R_4$ is hydrogen or a primary or secondary alkyl group with 1 to 4 carbon atoms.

2. The non-staining white-wall tire stock of claim 1 wherein the enamine is present in about 0.5 to 2.5 parts by weight per 100 parts of tire stock.

3. The non-staining white-wall tire stock of claim 1 wherein the enamine is present in about 1.0 to 2.0 parts by weight per 100 parts of tire stock.

4. The white-wall tire stock of claim 1 wherein R and $R_1$ of the enamine are each selected from alkyl groups with 1 to 4 carbon atoms.

5. The white-wall tire stock of claim 1 wherein $R_2$ of the enamine is an alkyl group with up to 6 carbon atoms, and $R_3$ of the enamine is an alkyl group with up to 2 carbon atoms.

6. The white-wall tire stock of claim 1 wherein $R_4$ of the enamine is hydrogen.

7. The white-wall tire stock of claim 1 wherein $R_4$ of the enamine is methyl or ethyl.

8. The white-wall tire stock of claim 1 wherein the enamine is 1-(2,6-dimethylmorpholino)-2-ethyl hexene-1.

9. The white-wall tire stock of claim 1 wherein the enamine is N,N'-di(cyclohex-3-enylidene methyl) piperazine.

10. The white-wall tire stock of claim 1 wherein the enamine is N-(2-ethyl-hex-1-enyl)-dibutylamine.

11. The white-wall tire stock of claim 1 wherein the enamine is N-(cyclo-hex-3-enylidene methyl) diallylamine.

12. A method of protecting a white-wall tire stock from ozone and from staining due to the antiozonant comprising incorporating into a white-wall tire stock before vulcanization an antiozonant effective amount of an enamine of the formula

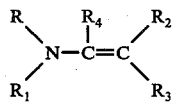

wherein R and $R_1$ are each primary or secondary, saturated or unsaturated alkyl groups with 1 to 8 carbon atoms, or together with the nitrogen form a cyclic ring structure having 4 to 6 carbon atoms; $R_2$ and $R_3$ are each hydrogen, an alkyl group with 1 to 6 carbon atoms, or joined together to form a cyclic ring structure having 5 to 7 carbon atoms; and $R_4$ is hydrogen or a primary or secondary alkyl group with 1 to 4 carbon atoms; and wherein said white-wall tire stock comprises natural rubber, styrene-butadiene rubber, and ethylene-propylene-non-conjugated diene terpolymer rubber.

13. The method of claim 12 wherein the enamine is used in about 0.5 to 2.5 parts by weight per 100 parts of tire stock.

14. The method of claim 12 wherein R and $R_1$ of the enamine are each selected from alkyl groups with 1 to 4 carbon atoms.

15. The method of claim 12 wherein $R_2$ of the enamine is an alkyl group with up to 6 carbon atoms, and $R_3$ of the enamine is an alkyl group with up to 2 carbon atoms.

16. The method of claim 12 wherein $R_4$ of the enamine is hydrogen.

17. The method of claim 12 wherein $R_4$ of the enamine is methyl or ethyl.

18. The method of claim 12 wherein the enamine is 1-(2,6-dimethylmorpholino)-2-ethyl hexene-1.

19. The method of claim 12 wherein the enamine is N,N'-di(cyclohex-3-enylidene methyl) piperazine.

20. The method of claim 12 wherein the enamine is N-(2-ethyl-hex-1-enyl)-dibutylamine.

21. The method of claim 12 wherein the enamine is N-(cyclo-hex-3-enylidene methyl) diallylamine.

* * * * *